(12) United States Patent
Briscoe et al.

(10) Patent No.: US 7,747,240 B1
(45) Date of Patent: Jun. 29, 2010

(54) METHOD OF CHARGING IN A COMMUNICATIONS NETWORK

(75) Inventors: Robert J Briscoe, Suffolk (GB); Michael Rizzo, Suffolk (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 09/674,706

(22) PCT Filed: Jun. 4, 1999

(86) PCT No.: PCT/GB99/01772

§ 371 (c)(1),
(2), (4) Date: Nov. 6, 2000

(87) PCT Pub. No.: WO99/65184

PCT Pub. Date: Dec. 16, 1999

(30) Foreign Application Priority Data

| Jun. 5, 1998 | (GB) | 9812161.9 |
| Nov. 24, 1998 | (EP) | 98309609 |
| Nov. 24, 1998 | (GB) | 9825723.1 |
| Jan. 29, 1999 | (GB) | 9902052.1 |
| Feb. 5, 1999 | (GB) | 9902648.6 |

(51) Int. Cl.
*H04M 11/00* (2006.01)
*G06F 11/00* (2006.01)
*H04B 3/20* (2006.01)
*H04M 15/00* (2006.01)

(52) U.S. Cl. ............... 455/405; 455/406; 370/238; 370/389; 379/112.01; 379/114.07

(58) Field of Classification Search ............... 379/131; 235/380; 705/34, 30, 39, 40, 26, 27, 44, 705/413, 1; 709/200, 219, 224, 225; 713/200, 713/201; 370/351, 238, 400, 389; 707/103 R, 707/1; 455/9, 404.2, 405, 406

See application file for complete search history.

(56) References Cited

U.S. PATENT DOCUMENTS

| 4,756,019 A | 7/1988 | Szybicki |
| 4,796,297 A | 1/1989 | Okamoto et al. |
| 4,896,319 A | 1/1990 | Lidinsky et al. |
| 5,067,149 A | 11/1991 | Schneid et al. |
| 5,440,547 A | 8/1995 | Easki et al. |

(Continued)

FOREIGN PATENT DOCUMENTS

DK        4241434 A1      6/1994

(Continued)

OTHER PUBLICATIONS

Dr. Gregory Ruth and Cyndi Mills; "Usage-Based Cost Recovery in Internetworks"; Business Communications Review; Jul. 1992; pp. 38-42.*

(Continued)

*Primary Examiner*—Ella Colbert
(74) *Attorney, Agent, or Firm*—Nixon & Vanderhye P.C.

(57) ABSTRACT

In a communications network, use of network resources is measured locally at customer terminals, for example by counting the number of packets sent and received. The resulting data may be aggregated and sent to a network accounting object. Accounting data may subsequently be passed between network subdomains.

35 Claims, 14 Drawing Sheets

U.S. PATENT DOCUMENTS

| | | | |
|---|---|---|---|
| 5,448,628 A | 9/1995 | Muroi et al. | |
| 5,631,897 A | 5/1997 | Pacheco et al. | |
| 5,751,799 A | 5/1998 | Mori | |
| 5,828,737 A * | 10/1998 | Sawyer | 379/114.07 |
| 5,852,812 A * | 12/1998 | Reeder | 705/39 |
| 5,873,030 A * | 2/1999 | Mechling et al. | 455/408 |
| 5,956,331 A | 9/1999 | Rautiola et al. | |
| 5,978,456 A * | 11/1999 | Takeuchi | 379/131 |
| 5,982,754 A | 11/1999 | Itou et al. | |
| 6,005,926 A | 12/1999 | Mashinsky | |
| 6,009,154 A * | 12/1999 | Rieken et al. | 379/114.12 |
| 6,032,132 A | 2/2000 | Nelson | |
| 6,035,281 A * | 3/2000 | Crosskey et al. | 705/14 |
| 6,047,051 A * | 4/2000 | Ginzboorg et al. | 379/130 |
| 6,088,659 A * | 7/2000 | Kelley et al. | 702/62 |
| 6,098,878 A * | 8/2000 | Dent | 235/380 |
| 6,108,330 A | 8/2000 | Bhatia et al. | |
| 6,118,768 A | 9/2000 | Bhatia et al. | |
| 6,128,601 A | 10/2000 | Van Horne et al. | |
| 6,144,727 A | 11/2000 | Mashinsky | |
| 6,154,445 A | 11/2000 | Farris et al. | |
| 6,226,365 B1 | 5/2001 | Mashinsky | |
| 6,292,466 B1 | 9/2001 | Droz | |
| 6,324,522 B2 | 11/2001 | Peterson et al. | |
| 6,338,046 B1 * | 1/2002 | Saari et al. | 705/34 |
| 6,351,737 B1 | 2/2002 | Williams | |
| 6,408,174 B1 | 6/2002 | Steijer et al. | |
| 6,430,275 B1 | 8/2002 | Voit et al. | |
| 6,434,537 B1 | 8/2002 | Grimes | |
| 6,480,470 B1 | 11/2002 | Breivik et al. | |
| 6,542,588 B1 | 4/2003 | Mashinsky | |
| 6,577,858 B1 * | 6/2003 | Gell | 455/407 |
| 6,625,657 B1 * | 9/2003 | Bullard | 709/237 |
| 6,667,956 B2 | 12/2003 | Beshai et al. | |
| 6,671,285 B1 * | 12/2003 | Kirkby et al. | 370/468 |
| 6,714,979 B1 | 3/2004 | Brandt et al. | |
| 6,973,038 B1 | 12/2005 | Narendran | |
| 7,319,673 B1 | 1/2008 | Briscoe et al. | |
| 7,426,471 B1 | 9/2008 | Briscoe et al. | |
| 2001/0051951 A1 | 12/2001 | Nishikawa | |
| 2002/0091574 A1 | 7/2002 | Lefebvre et al. | |
| 2003/0154174 A1 | 8/2003 | Tassel et al. | |
| 2004/0024717 A1 | 2/2004 | Sneeringer | |

FOREIGN PATENT DOCUMENTS

| | | | |
|---|---|---|---|
| EP | 0734144 A2 | 3/1996 | |
| EP | 0837578 A | 4/1998 | |
| EP | 0917336 A2 | 5/1999 | |
| GB | 2311439 A | 9/1997 | |
| JP | 03-175841 | 7/1991 | |
| JP | 06-006349 | 1/1994 | |
| JP | 06-062035 | 3/1994 | |
| JP | 06-237316 | 8/1994 | |
| JP | 6-311261 | 11/1994 | |
| JP | 7-177264 | 7/1995 | |
| JP | 08-331123 | 12/1996 | |
| WO | WO 95/27385 | 10/1995 | |
| WO | 97/05749 | 2/1997 | |
| WO | 97/23102 | 6/1997 | |
| WO | 97/26739 | 7/1997 | |
| WO | WO 98/02828 | 1/1998 | |
| WO | 98/58474 | 12/1998 | |
| WO | 99/65183 | 12/1999 | |
| WO | 01/69453 A1 | 9/2001 | |

OTHER PUBLICATIONS

Bowman, C. Douglas; "Innovative rates: Four Customers, four solutions"; Public Utilities Fortnightly; DialogClassic Web; V 134 n2; Jan. 15, 1996; pp. 25-29.*

Roche, Don, Jr.; "Finally . . . a log that will track and manage your time online. (et Cetera Inc's Online Log for Windows) (Software Review)(Brief Article)(Evaluation)"; Computer Shopper, V15, n8; Aug. 1995; pp. 1 and 2.*

Busse, I.; "Accounting management for global broadband connectivity services"; Deutche Telekom, Berlin Germany; Feb. 15-20 1998; p. 1.*

Estrin et al, "Design Considerations for Usage Accounting and Feedback in Internetworks", 8282 Computer Communication Review 20 (1990) Oct., No. 5, New York, US.

Nishibe et al, "Distributed Channel Allocation in ATM Networks", NTT Communication Science Laboratories, Nov. 29, 1993, pp. 417-423.

Sloman et al, "Domain Management and Accounting in an International Cellular Network", BNSDOCID:<XP 199363A, Apr. 1993, pp. 193-204.

Murphy et al, "Distributed Pricing for Embedded ATM Networks", BNSDOCID<XP 593354A, Jun. 1994, pp. 1053-1063.

Tarifmodelle gegen Status auf der Infobahn, XP-000779238, Apr. 1998.

Kaltenmorgen, Kleinewillinghofer-Kopp: "Verkehrskontrolle in ATM-Netzen"; Der Fernmelde Ingenieur, vol. 46, No. 1, Jan. 1992, pp. 1-33, XP000407119.

Mackie-Mason et al; "Pricing Congestible Network Resources"; IEEE Journal on Selected Areas in Communications, vol. 13, No. 7, Sep. 1, 1995, pp. 1141-1149, XP000577206.

Murphy et al.; "Feedback and Efficiency in ATM Networks"; 1996 IEEE International Conference on Communications (ICC), Converging Technologies for Tomorrow's Applications, Dallas, Jun. 23-27, 1996, vol. 2, pp. 1045-1049, XP000625931, Institute of Electrical & Electronics Engineers.

Hidano; "A Practical and Economical Approach to Resource Allocation"; 1997 IEEE 47$^{TH}$ Vehicular Technology Conference, Phoenix, May 4-7, 1997, vol. 3, No. Conf. 47, Nov. 18, 1996, pp. 1107- 1113, XP000741599.

Johnson, Johna Till; "Cisco Serves Up a Wealth of Functions"; Data Communications; May 21, 1992; 21; 8; ABI/INFORM Global; pp. 41-42.

Hannington, Stephen; "Price Cuts and New Lines to Catch the Customers"; The Times; London (UK); Nov. 17, 1997; pp. 1-3.

Anonymous; "Lucent Delivers High-Capacity Optical Networking Equipment to Increase Bandwidth on NTT's Network"; Fiber Optics Weekly Update; Boston; Jun. 5, 1998, vol. 18; Issue 23, pp. 6; 2 pages.

Lim, Wendy; "Call to Operators on Roaming Services"; [Shipping Times Edition]; Business Times; Kuala Lumpur; Jun. 5, 1998; pp. 1; 2 pages.

Bowman, C. Douglas; "Innovative Rates: Four Customers, Four Solutions"; Jan. 15, 1996; Public Utilities Fortnightly; v134n2; pp. 25-29.

Ruth et al.; "Usage-Based Cost Recovery In Internetworks"; Business Communications Review, US, Hinsdale, IL, vol. 22, No. 7, Jul. 1, 1992, pp. 38-42; XP000577637.

Honig et al, "Usage-based pricing of packet data generated by a heterogeneous user population," INFOCOM '95, 14$^{th}$ Annual Joint Conference of the IEEE Computer and Communication Societies, Apr. 1995, pp. 867-874, vol. 2.

U.S. Appl. No. 09/674,717, filed Nov. 6, 2000 including Office Action mailed Jan. 3, 2007 and Applicant Response filed Jun. 4, 2007.

U.S. Appl. No. 09/674,720, filed Nov. 6, 2000 including Office Action mailed May 29, 2007 and Applicant Response filed Feb. 28, 2007.

Office Action dated Apr. 22, 2009 issued in corresponding Japanese Application No. 2000-554088 with an at least partial English-language translation thereof.

Hisao Uose et al., "Network Architecture for Multimedia Communications Services using ATM Technology," NTT R&D, vol. 44, No. 11, Telecommunications Association, Nov. 10, 1995, p. 1015-1024 with partial English-language translation and abstract.

English translation of Japanese Office Action dated Mar. 13, 2009 issued in Japanese Application No. 2000-554090.

English translation of Japanese Office Action dated Aug. 25, 2008 issued in Japanese Application No. 2000-554090.
English translation of Japanese Office Action dated Jul. 1, 2008 issued in Japanese Application No. 2000-554088.

English translation of Japanese Office Action dated Nov. 19, 2008 issued in corresponding Japanese Application No. 2000-554089.

* cited by examiner

| BTInternet Internet Accounting Control Platform | | _ □ × |

Local Platform ID: BTinternet
Local Meter ID: local
Local Reporting Rate: 1000

Reporting Source: [ ]  [Add]  [Remove]

Demon
MCI
BTInternet

[Report NOW!]

Required Reporting Rate: 2000

Reporting Phase: [ ]

☐ Report priced data

Security

☐ Encryption required
☐ Digital signing Required

[Update]

Fig. 6

METHOD OF CHARGING IN A COMMUNICATIONS NETWORK

CROSS REFERENCE TO RELATED APPLICATIONS

The present application claims the benefit of priority from the following applications: GB 9812161.9 filed Jun. 5, 1998; EP 98309609.0 filed Nov. 24, 1998; GB 9825723.1 filed Nov. 24, 1998; GB 9902052.1 filed Jan. 29, 1999; and GB 9902648.6 filed Feb. 5, 1999. The present application includes aspects of the inventions disclosed and claimed in GB patent application no. 9812161.9 filed 5 Jun. 1998, the contents of which are incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable—no disk submitted.

BACKGROUND OF THE INVENTION

1. Field of the Invention

The present invention relates to a communications network, and in particular to charging mechanisms in such a network.

2. Description of Related Art

In conventional communications networks, such as national PSTNs (public switched telephone networks), a significant proportion of the network resources are devoted to metering and billing network usage. Studies have estimated these resources as consuming as much as 6% of the revenue of a telecommunications company. The Internet, by contrast, does not in general incorporate metering and billing mechanisms for individual customers. The absence of the network infrastructure required to support metering and billing reduces the operational costs of the Internet compared to conventional telephony networks, and has facilitated the rapid expansion of the Internet. However the absence of appropriate billing mechanisms has significant disadvantages in terms of the characteristics of the traffic carried by the internet. It encourages profligate use of network resources, and diminishes the incentive for investment in network infrastructure to support new applications requiring, e.g., guaranteed quality of service (QoS) and led to subscription based Internet access services.

BRIEF SUMMARY OF THE INVENTION

According to a first aspect of the present invention, there is provided a method of operating a communications network comprising:

a) measuring at each of a plurality of customer terminals usage by the respective customer terminal of network resources; and b) subsequently calculating a network usage charge from the measurement data generated by step (a).

The present inventors have found that a key step in implementing a lightweight charging protocol suitable for use in a federated network is to de-centralize the metering of network usage by arranging for each customer terminal to monitor its own use of network resources. In this way a charging mechanism is provided that is intrinsically scaleable and that avoids significant overheads within the network.

Moreover, the invention, in preferred implementations, provides a basis for a multi-service packet network in which it is not necessary to police every packet. This makes it far easier to implement a multi-service network, i.e. one in which different packets may be scheduled differently according to which class of service applies, than with existing schemes.

Preferably the method includes storing the measurement data generated by step (a). Preferably there is stored with the measurement data identifying a tariff applicable to the said measurement data. The said data identifying the tariff may be the tariff itself, or may take the form of some identifying code or pointer for the tariff. Storing the tariff enables accounting data to be generated from measurements at the customer terminal even if the tariff varies over time.

Preferably the method includes communicating data generated by step (a) to a network accounting object controlled by a network operator. Alternatively data may be communicated from the network operator to the customer in a conventional way. The network usage data may be communicated explicitly and the charge for network usage calculated by the network operator. Alternatively the usage data may be communicated implicitly in accounting data indicating a charge calculated by the customer terminal.

Preferably the method includes a step carried out by the network operator of sampling only part of the traffic communicated between a customer terminal and the network. This sampled traffic is then compared with the network usage data reported from the customer terminal to the network provider accounting object, thereby detecting any discrepancy. The comparison may be of the total charged for network usage, or may be of the detailed measurement data. The former may be the norm for efficiency, with the latter used, in this case, only if the former shows discrepancies, in order to store evidence of fraud.

The inventors have found that the efficiency of the charging process can be further enhanced if the customer is responsible for measuring usage and providing usage data or priced usage data and the network operator measures only a sample of the customer traffic, on a random basis, to confirm the reliability of data provided by the customer.

Preferably the network operator accounting object is configurable to receive data either from a measurement object controlled by the network operator or from a customer terminal. Preferably the method includes changing from one configuration to the other in response to a control signal received at the network accounting object.

Preferably the method includes communicating measurement data to a system remote from the customer terminal. For example, data may be communicated from a number of customer terminals to a corporate accounting system. The data may be sent explicitly, and/or a usage charge calculated using the data may be sent to the remote system. When data is reported to a remote system, this may be done immediately the data is generated, or may be done in the form of a report aggregating data from a series of measurements over a period of time.

Preferably the method includes:

communicating traffic between a customer terminal and a first network domain connected to the customer terminal, further communicating the said traffic between the first network domain and a second network domain connected to the first network domain;

communicating network usage data from the customer terminal to a first network accounting object in the first domain;

communicating accounting data between the first network accounting object and a second network accounting object in the second domain.

This aspect provides a powerful and efficient method of accounting between domains in a federated data network. Although data may be flowing e.g. from a first customer terminal, via intermediate network domains to a second customer terminal, the accounting data (i.e. the measurement data or data derived therefrom) need not all flow in the same direction. The invention encompasses, for example, systems in which accounting data is passed from the customer to the first domain and also is passed from the second network domain to the first network domain.

Preferably the method includes determining from a current routing table in the first network domain the identity of a second domain communicating data with the customer terminal via the first network domain, and communicating accounting data for the customer terminal with the second domain identified by the current routing table.

According to another aspect of the present invention, there is provided a method of operating a network comprising a plurality of network domains, including calculating a charge for use by a respective customer of network resources, and making payment in settlement of the said charge to a third party clearer. This clearing payment may be used to apportion charges between the end users in any desired ratio, e.g. the sender pays all, or sender pays 60%, receiver pays 40%, etc.

According to a further aspect of the present invention, there is provided a method of operating a packet network providing a plurality of different service levels, the method including passing the said packets through a packet router, and in the packet router determining a classification of packets, scheduling packets differently depending on the packet classification and, at a location remote from the router, policing the service levels of packets to determine the eligibility of a packet for a respective service class.

The invention also encompasses communications networks arranged to operate by the methods of the invention, and customer terminals, and network accounting servers, and routers for use in such a network.

BRIEF DESCRIPTION OF THE DRAWINGS

Systems embodying the present invention will now be described in further detail, by way of example only, with reference to the accompanying drawings, in which:

FIG. 6 is a diagram showing a graphic user interface (GUI) for use with the objects of FIGS. 5a to 5e;

DETAILED DESCRIPTION OF EXEMPLARY EMBODIMENTS OF THE INVENTION

Figure 1:
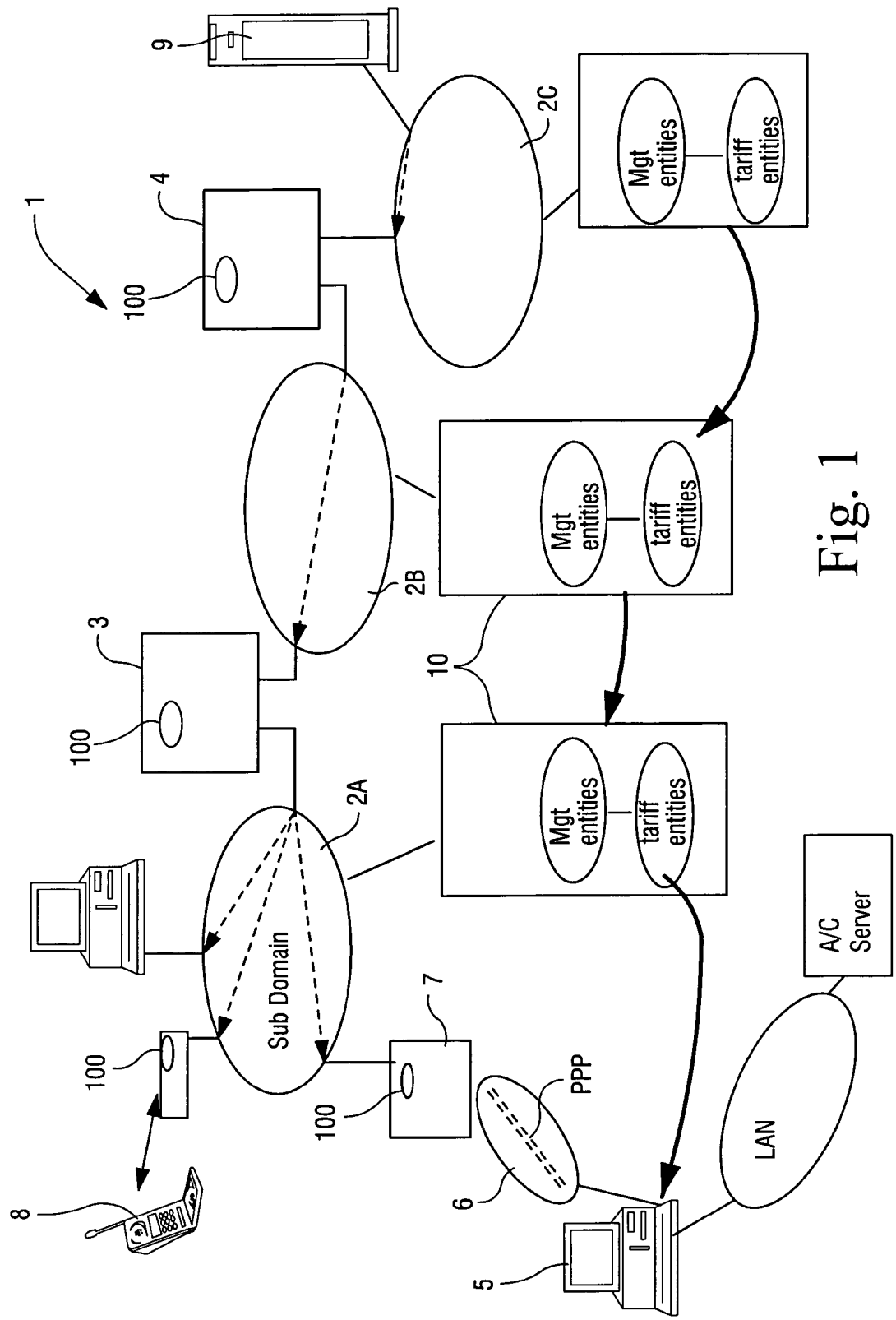
FIG. 1 is a schematic showing a network embodying the invention.

As shown in FIG. 1, a communications network 1 includes a number of network sub-domains 2A-C. The network sub-domains may be under the control of different operators. The operation of the network does not assume that there is mutual trust between the different operators. The network subdomains are interconnected by gateway routers 3, 4. In the present example the communications network is the Internet and supports both unicast and multicast Internet Protocol (IP) and associated protocols. A customer terminal 5 is connected via a public switched telephony network (PSTN) 6 and an access router 7 to a subdomain 2A. No policing is required at the access router. The gateway routers 3,4, and access router 7 may be commercially available devices such as CISCO series 7500 routers and CISCO series AS5800 universal access server respectively. Other customer terminals are connected to the network, including a Java-enabled mobile terminal 8 and a data server 9.

The customer terminal 5 may be connected via a LAN to an accounting server. The accounting server may include an accounting object as described below that receives measurement data from the customer terminal.

Tariffs for the use of network resources are multicast through the network to the customer terminals. These tariffs are divided into bands of different volatilities. The tariffs are varied under the control of the network operators to reflect the overall loading of the network. That is to say, if network loading becomes high then the tariffs may be increased to reflect the scarcity of network resources. A network management platform 10 is connected to each subdomain. Each network management platform may comprise, for example, a computing system comprising a SPARC workstation running UNIX (Solaris) together with network management applications. The network management platform 10 hosts management entities and tariff entities. It may also function as an accounting server hosting network accounting objects as described below. The network management platform communicates with agents 100 in managed devices connected to the respective subdomain, for example using SNMP (simple network management protocol). The management platform monitors the overall loading of network resources in the respective subdomains, and adjusts the tariffs for network use accordingly. The Net management platform (NMP) instructs the agent to monitor the device and report aggregated results at regular intervals back to the NMP, so the NMP can monitor the combination of all reports.

In addition to this central control of the tariffs, a tariff algorithm at each customer terminal may be arranged to respond automatically to a locally detected variation in the loading of network resources. The use of local tariff variation is described below.

A service provider may offer different products defined by different service level agreements, and/or by different price volatilities. For example product A might offer best-effort service at a fixed price while another product B might offer best-effort service at a variable price. A service provider may adjust product prices on the basis of the following parameters: the price the service provider pays to its wholesale provider: competitors' prices; current resource utilization; relevant demand for different products. In response to changes in these parameters, tariff adjustments may be effected in one of three ways. Firstly, a tariff may adjust prices on the basis of local observations of network loading, without necessitating explicit communication from the provider. This approach, which is described in further detail below, needs to be built into the tariff at the outset, and is limited to those price variations which are dependent exclusively on local observations. Secondly, the provider may tune a tariff by adjusting some of its parameters. This kind of adjustment is required when the decision is dependent on parameters which cannot be observed directly by the customer, e.g., variation in the wholesale price of network resources. Thirdly, the provider may completely replace a tariff. This is required when the existing tariff cannot accommodate the changes that are required.

The first of the tariff changes described above is necessarily carried out automatically. The second type of change may be performed manually, or by an agent that issues adjustments automatically in response to observations made by the service provider system. The third type of change is likely to be performed manually, as replacement of a new tariff will in general require an element of design requiring human input. However, it is possible that an agent might be employed to automatically switch tariffs for a product on the basis of a set of specified rules.

This section describes a prototype that we implemented to demonstrate the tariff subsystem outlined above. Features of the design include:

using mobile code to represent tariffs and associated user interface components;
use of a repeated multicast announcement protocol to communicate tariffs and tariff adjustments efficiently;
using dynamic class loading and reflection in order to receive and tune tariffs.

The prototype consists of a library of general-purpose Java classes and two specific applications, namely:

a provider system which allows the provider to introduce, replace, and tune tariffs for a number of products;
a customer system that enables customer to keep track of the charges being applied for the products they are using.

The provider system services multiple instances of the customer system running on different hosts in a multicast-enabled network. A multicast announcement protocol is used to communicate tariff changes from the provider system to customer systems.

In order to maximize flexibility with respect to the definition of tariffs, we chose to represent tariffs using Java classes. This technique is also used to supply user interface components to customers to support visualization of the behavior of a tariff.

The Tariff interface acts as the base class for all tariffs. This defines a single operation get GUI ( ) which returns as a Java SWING component that can be incorporated into the customer's GUI (graphical user interface). This GUI component enables the customer to visualize the behavior of the tariff using techniques appropriate to the tariff.

Figure 12:
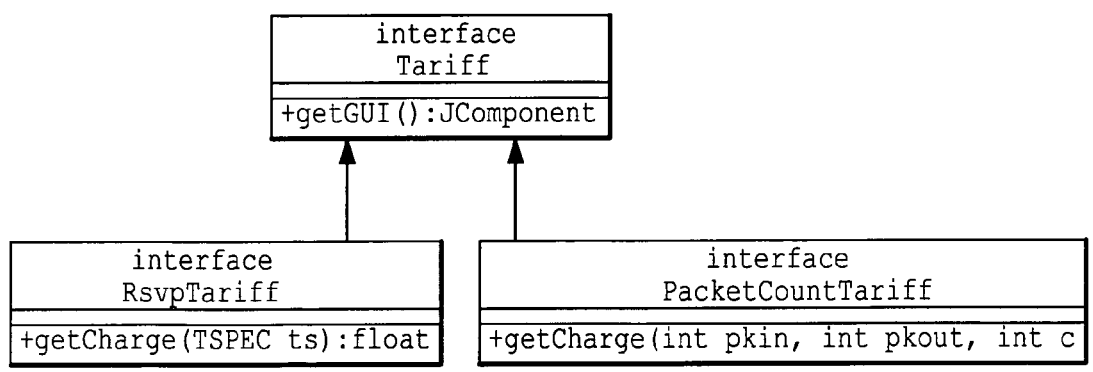
FIG. 12 shows tariff interfaces.

Subclasses of the Tariff interface establish a set of tariff types, each of which is associated with a different set of measurement and input parameters. These parameters are identified by listing them in the signature of the getCharge ( ) method. For example, the interface RSVPTariff defines get-Charge ( ) as receiving n RSVP TSPEC, allowing for the definition of tariffs that compute price on the basis of the characteristics of an RSVP reservation. On the other hand, the interface PacketCountTariff defines getCharge ( ) as receiving measurements of packets in, packets out, and current congestion (typically measured as a function of packet drop), allowing for the definition of tariffs that are dependent on packet counts and sensitive to congestion. Other tariffs may be added as new forms of usage-measurement emerge. The Tariff interface and the subclass tariff interfaces RSVPTariff and PacketCountTariff are illustrated in FIG. 12.

Tariffs are defined by providing implementations of the various tariff interfaces described above. For example, the tariff PacketCountLinear implements PacketCountTariff to compute charges in proportion to packet counts. Another tariff CongestionSensitiveLinear works on a similar basis, but adds a penalty charge if the customer does not stay within a specified traffic limit in the presence of congestion.

In addition to the tariff interface implementation, a tariff may make use of other 'helper' classes to assist in its operation, as well as one or more user interface component classes for customer visualization purposes. A provider-side user interface may also be required in order to enable the provider to make tariff adjustments.

A complete tariff description consists of a set of Java classes, some of which are destined for the customer system and others which are intended for use by the provider system. The customer-side classes are bundled into a Java archive (JAR) file to facilitate processing by the provider system.

In order to deploy a new tariff, the provider system first loads the tariff classes which it requires into its execution environment. It then loads the customer-side bundle, serializes it, signs it with a private key, and uses an announcement protocol to distribute it to customer systems. The use of a signature makes it possible for customers to verify that received tariffs are authentic.

Upon receiving the bundle, each customer system verifies the signature (using the public key matching the provider's private key), and at the activation time specified in the announcement protocol headers which may be significantly later, e.g. hours or days, unpacks the bundle, and loads the classes into its execution environment using a purpose-built dynamic class loader. An instance of the received tariff class is created and installed in place of the previous tariff. If the tariff has a user interface component (obtained by calling the tariff object's getGUI ( ) method), then it replaces the user interface of the previous tariff. The change in user interface serves to notify the user that the tariff has changed.

Tariff adjustment involves the remote invocation of an operation which is specific to the tariff currently in force. This means that a customer system cannot know the signature of this operation in advance of receiving the tariff i.e. the operation will not be listed in any of the tariff interfaces known to the customer system.

In order to get around this problem, use is made of the "reflection" feature supported by Java. In order to disseminate a tariff adjustment, the provider creates an instance of an Invocation object, which stores the name of the operation to be called, together with the parameters that are to be supplied to it. This object is then serialized, signed, and announced using the announcement protocol. When an adjustment is receive and verified by a customer system, the Invocation object is de-serialized and applied to the current tariff by using reflection to invoke the described operation.

In order to simplify the announcement protocol, adjustments are required to be idempotent and complete. Idempotency guarantees that a tariff will not be adversely affected if an adjustment is applied more than once. Completeness implies that an adjustment determines the entire parameter set of a tariff object, so that an adjustment completely removed the effects of any previously applied adjustments.

The customer system may apply a tariff by repeatedly invoking the getCharge ( ) operation supported by that tariff every second, and adding the returned value to the cumulative charge. The parameters supplied to getCharge ( ) depend on the kind of tariff currently in force. For example, if the tariff is an implementation of PacketCountTariff, then measurements of inbound packets, outbound packets and congestion over the past second are required. However, if the tariff is an implementation of RsvpTariff, then only a TSPEC describing the current reservation is required. This implies that a customer system can only subscribe to a product if it can supply the parameters require by the tariff associated with hat product.

Each invocation of the getCharge ( ) method also results in an update to the tariff-specific user interface. For example, in the CongestionSensitiveLinear tariff, the usage parameters supplied to getCharge ( ) are used to update the graphical displays of traffic and congestion.

The announcement protocol is used to communicate serialized tariffs and adjustments from a provider system to multiple customer systems. The number of customer systems is assumed to be large, and a repeated multicast solution is adopted.

Each product supported by a provider is assigned a multicast channel for announcement purposes. Customer systems listen to the channels corresponding to the products that they are using. In the current implementation, it is assumed that each customer system has knowledge of well-known multicast addresses for the products it is interested in.

For each product channel, the provider repeatedly announces the current tariff and the most recent adjustment made to it (if any). Each announcement carries a version number, which is incremented each time the announcement is changed. Customer systems only process announcements when a version number change is detected. If a new customer joins a channel, it waits until it receives a tariff before processing any adjustment announcements. Furthermore, an adjustment is only applied if its announcement version is greater than that of the current tariff, thereby ensuring that a missed tariff announcement does not result in the application of a subsequent adjustment to an old tariff.

In the present example, charging is carried out using a "pay and display" process but traditional payment methods can alternatively be used. The objects used to implement the charging architecture in this case are now described. The objects comprise higher level objects and component objects used in a software implementation of the charging architecture. Some objects are intended to reside on the client terminal (e.g., client terminal 5) and others are intended to reside somewhere within the "Edge Network" (e.g., access router 7 and the corresponding network sub-domain—see FIG. 1). The objects on the customer terminal include a session control object S, a customer business rules object $B_c$, a customer pricing object $Pr_c$, a QoS manager Q, a customer accounting object $Act_c$ and a customer measurement object $M_c$. The business rules object $B_c$ receives information on those aspects of the session which involve liability for payment and receives current pricing data from the pricing object $Pr_c$. The customer business object makes decisions, under the customer's policy control on which chargeable services are utilized, and how much of the chargeable services are utilized. These decisions are fed to the QoS manager Q, which decides which mechanisms are used to achieve the requirements. The QoS manager (and the accounting object) then controls the customer measurement object $M_c$ to determine which aspects of traffic and service to measure and which aspects to ignore. The measurement object then records the selected aspects of the traffic, for example counting the number of packets transmitted and received by the customer terminal and the QoS levels for those packets. These data, together with the current tariffs, including any premium for congestion, are then used by the customer terminal to determine the charge payable to the network operator. The measurement object $M_c$ is also programmed, by the accounting object, with instructions that determine the frequency at which data is reported to the customer accounting object $Act_c$. The customer accounting object $Act_c$ passes accounting information (priced or not) to an accounting object $Act_p$ in the network provider's domain. On the network provider's side, that is to say within the subdomain to which the customer terminal is connected, the customer's traffic is measured by a version of M, denoted $M_p$, but only on a sampling basis determined by the policing function, Po. That is to say, the network operator samples the customer's traffic only intermittently. Po controls where in the network measurements are made in order to capture all of any particular customer's traffic. A bulk measurement function, $M_b$, is responsible for reporting aggregate traffic levels, as reflected in the moving average of the router queue lengths, to the pricing object, $Pr_p$. Bulk measurements would typically be collected from across the provider's domain to a centralized pricing function (which would be replicated for reliability). $Pr_p$ sets prices taking into account the business rules from the network provider's business object, $B_p$, as well as the current traffic levels reported by Mb and pricing from neighboring providers. The policing function, Po, compares sample measurements from $M_p$ with accounting messages received at $Act_p$ as a result of the customers own measurements. If it establishes that the accounts are insufficient it might restrict service at the access control gateway, Acs, or initiate some other punishment. Encapsulated within the accounting object another policing object checks the accounts match the payments within the contracted time for payment. Finally, the identity mapping function, I, provides a mapping between a customer's identity (account, digital signature, etc.) and their current network address (typically allocated by the ISP, whether unicast or multicast).

The measurement (M) objects provide to the accounting (Act) objects the information that is required to create firstly accounting records and subsequently reports and bills. Measurement records are not stored as such in the Act objects: measurement data is translated into accounting records as soon as possible. The translation of measurement data into accounting records involves a change of class type and some aggregation. In addition the measurement data may be linked to tariff information. The measurement data returned by the measurement objects includes, in this example, the following elements:

IP addresses of the two endpoints involved in the communication. This is readily available from the network packets.

Port numbers: These are used to distinguish between different services used by a user at one time. The port numbers are also available from the network packets.

Type of packets: service identity. This identifies the type of service, e.g. as RSVP, as differential service or as data. This information allows different tariffs to be applied depending on the packet type.

Network usage information. This is the measurement data itself and may comprise, for example, a count of the number of packets.

Time period information. This, if element, when used, indicates the length of time over which the measurement was made Time reference. This may include a start time and an end time and may be used, for example, for applying discounts to traffic during defined "off-peak" hours.

In the presently preferred implementation, measurement data is returned by the measurement object to the Act object on an event-driven basis at time intervals controlled by the accounting object. Alternative approaches may use polling of the measurement object by the Act object, or event driven polling: Communication of data may be effected using Java-RMI (remote method invocation) and the Java event model or a socket may be created between Act and M to send measurement objects. Further alternative communication mechanisms include the use of CORBA or SNMP like messaging. The present example makes use of an RMI/CORBA-like distributed event programming infrastructure called FLEXI-NET.

Measurement objects (M) offer a control interface to Act objects, so that Act objects can control what measures, and when and where M reports its measurement information. This control interface offers access to the following parameters:

1. Frequency at which measurement records are required (for a given customer or set of customers). This makes it possible to accommodate different accounting business models including, e.g., pay-as-you-go and traditional billing. The frequency may be specified as a period of a number of milliseconds.

2. What is to be reported to Act (for a given customer or set of customers). This parameter might specify all packets, or only packets with a give QoS threshold etc.

3. Where to report measurements (for a given customer or set of customers). This parameter may be a simple reference to the Act object or another business-related object for auditing or marketing purposes.

4. Current metering properties of the measurement object.

The Meter M at the network provider multiplexes the different measurement request for different customers and optimize the measurement and reporting processes.

The accounting objects on the customer terminal may be implemented using a small encrypted flat-file database. On the network provider's side, the equivalent objects may be implemented using a larger database that is scaleable to handle e.g., tens of thousands of customer accounts. An object request broker (ORB) is used for communication between the customer-side objects and the network-side objects, implemented using commercially available tools such as ORBIX™ from Iona Technologies plc. Serialization is used to stream objects from one database to another via the network. The process of serialization takes all the attributes of an object and streams the attributes over a specified medium together with information specifying the type of object that originated the data. A process of de-serialization then takes the data from the transmission medium together with the object type information and creates a new object of the specified type and fills it with the data. The accounting databases hold a set of serialized accounting objects. The larger database required by the network provider may be an object-oriented database that accepts objects and serializes them into its storage space. Alternatively a non object oriented database may be used, in which case the accounting objects are translated into database types. For example the accounting objects are translated into SQL data types for use with a relational database.

Figure 7:
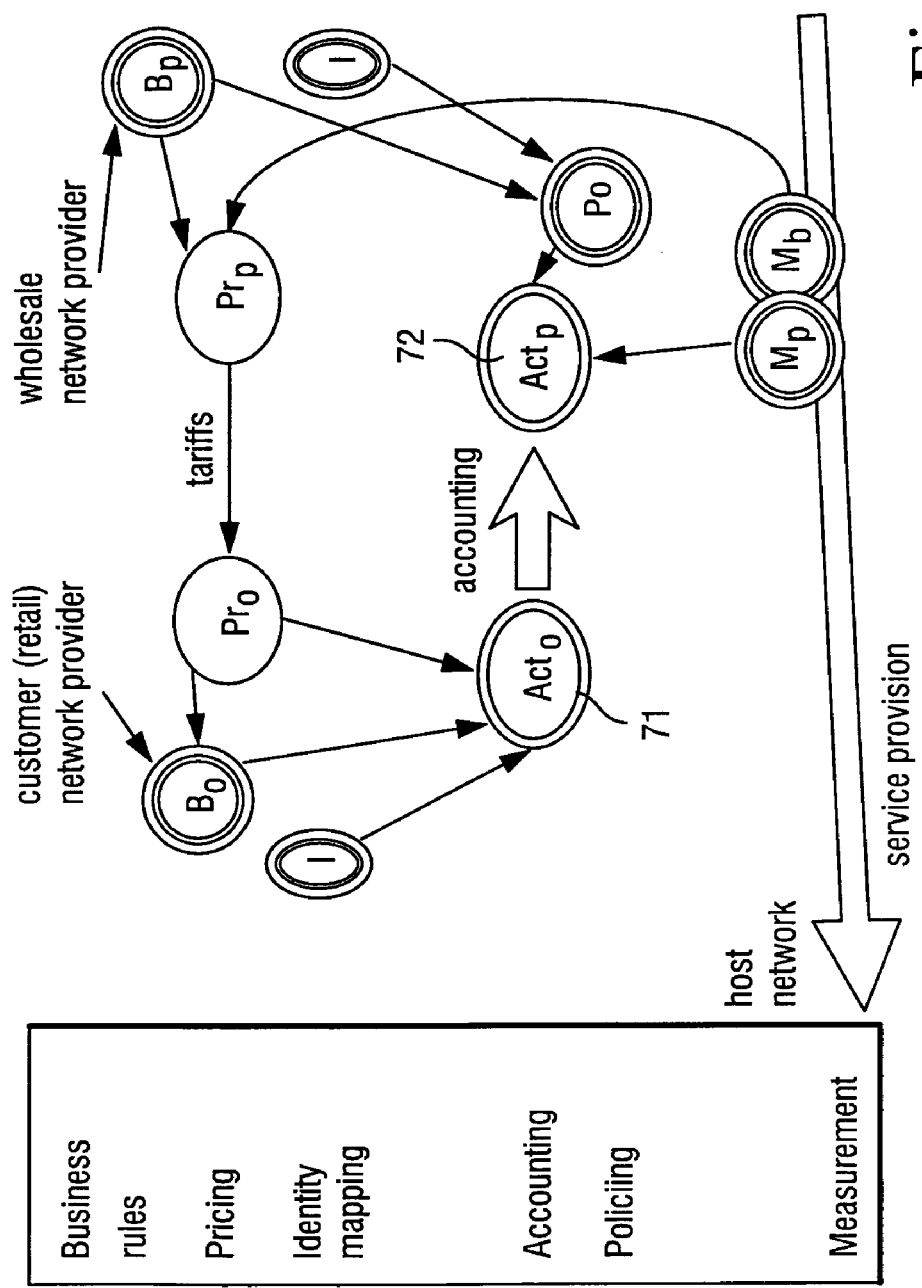
FIG. 7 is a diagram showing the interface between neighboring domains of the network of FIG. 1.

The serialization/de-serialization mechanism described above is also used to support the measurement and accounting interface between network domains. For example, the edge-of-network domain that communicates packets to and from the customer terminal in turn passes packets to a number of neighboring domains. Just as accounting data is passed from the customer to the edge-of-network domain, so also accounting data is passed from an accounting object 71 in the edge-of-network domain to an accounting object 72 in a neighboring domain, and payment is made by the operator of the edge-of-network domain to the operator of the neighboring domain. In this context, the edge-of-network domain is a retail domain, and the neighboring domains are wholesale domains. As shown in FIG. 7, the architecture of the interface between the retail domain and the wholesale domains is a recursive version of the interface between the retail domain and the end customer. However all the measurement and QoS features of the interface to the end customer are not required in the interface between the retail and wholesale networks. Where, as in this example, there are multiple wholesale providers, then the current routing and/or address allocation in the retail network is interrogated to apportion accounting between the wholesale networks. This is effectively another form of identity mapping, I. The mapping is needed between the identities of each neighbor provider and their current groups of unicast addresses, address prefixes, multicast addresses or autonomous system (AS) numbers. This is not generally required in the edge architecture, as an edge customer typically has only one provider. If multiple providers were used by the customer, then mapping to apportion accounting is used at the edge too. As before, the measurement of traffic between retail and wholesale domains can be sampled and done in parallel to the data flow—no blocking is required. Any pair of network providers might in practice each be mutual customers. In this case, the architecture for the retail/wholesale interface is mirrored so that all functions operate in both directions. Any payments between network domains are then determined by the balance of the products of each accounting flow and the relevant prices.

Figure 8:
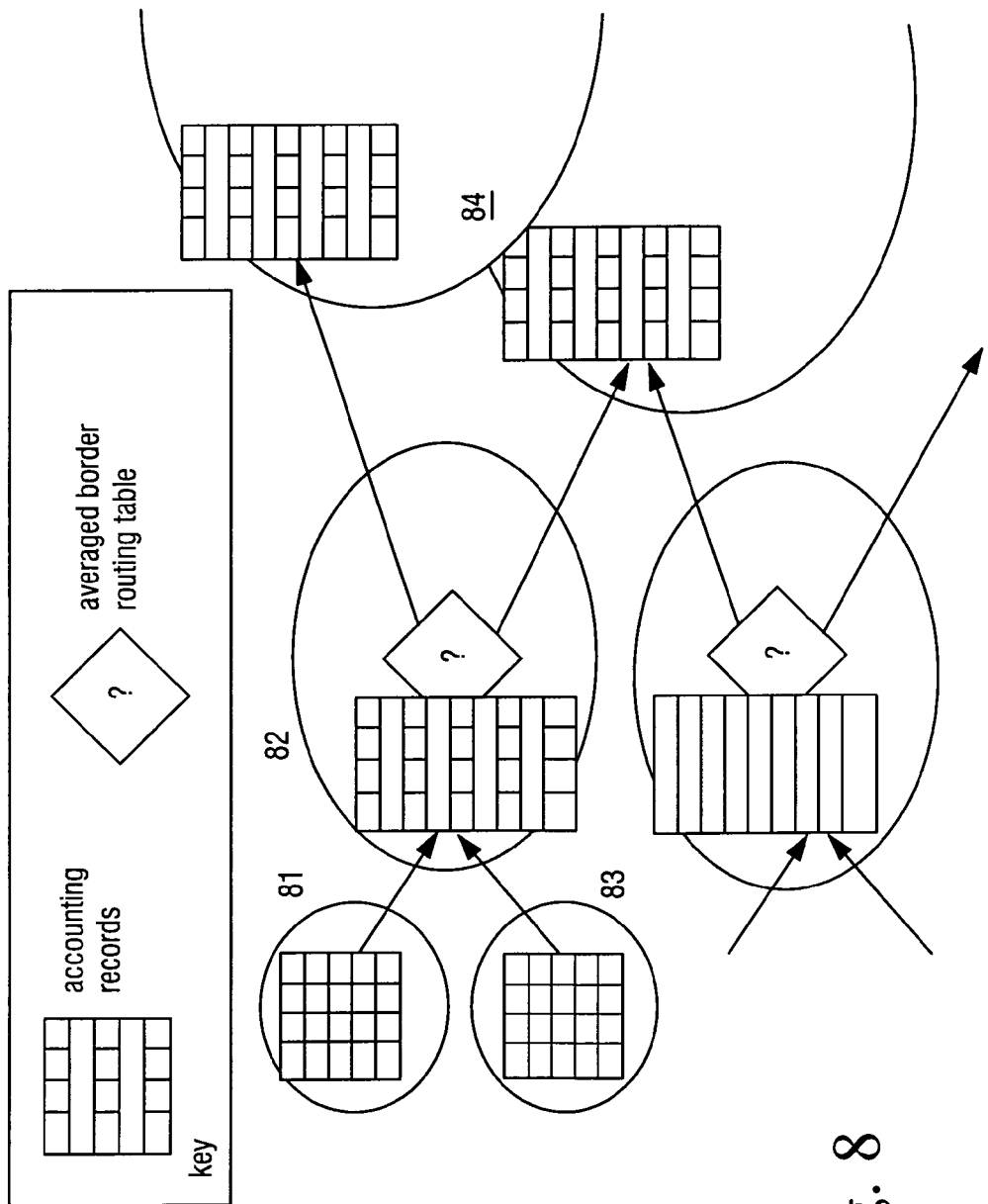
FIG. 8 is a diagram showing schematically the distribution of accounting data through multiple network domains.

In a network comprising multiple domains then, as shown in FIG. 8, a "wholesale" domain 82 may receive accounting data from a number of retail networks 81,83. These data are aggregated by the accounting object in domain 82 and then apportioned between further neighboring domains, such as domain 84. The way in which the accounting data are apportioned is determined by an averaged border routing table maintained in the domain 82

Figure 2:
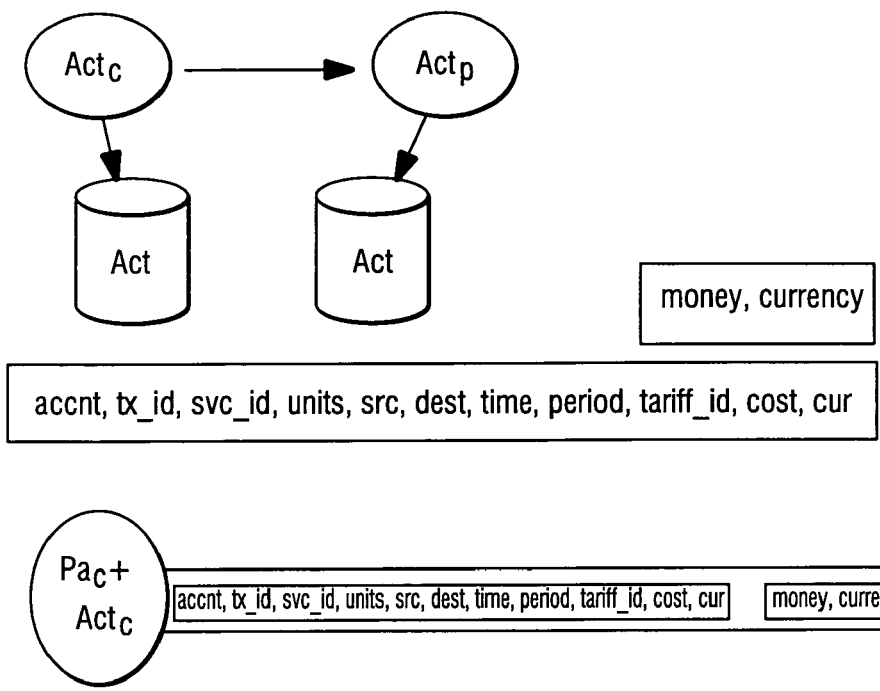
FIGS. 2 and 3 show data passed between the accounting objects used to implement an exemplary embodiment of the invention.
Figure 3:
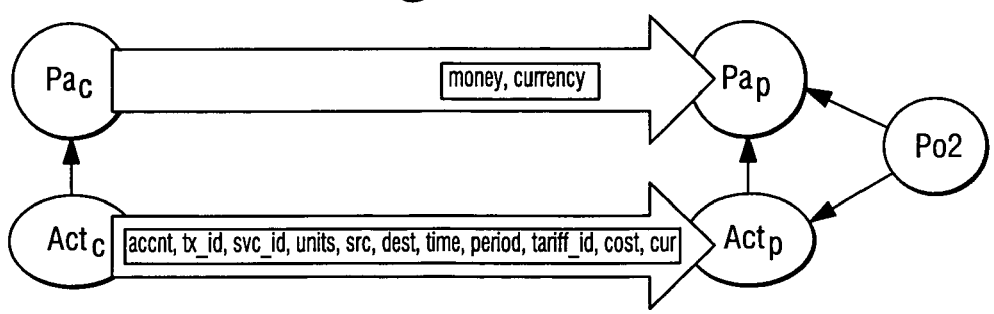

FIGS. 2 and 3 show the data which are passed between the accounting objects. In this example the account data comprises: account identity; bill record identity; service type identifier; source address; destination address; tariff identity; time; period (i.e. the period covered by the bill record); units; cost; and currency. In addition, the payment data comprises the amount of money and the currency of payment.

Figure 4:
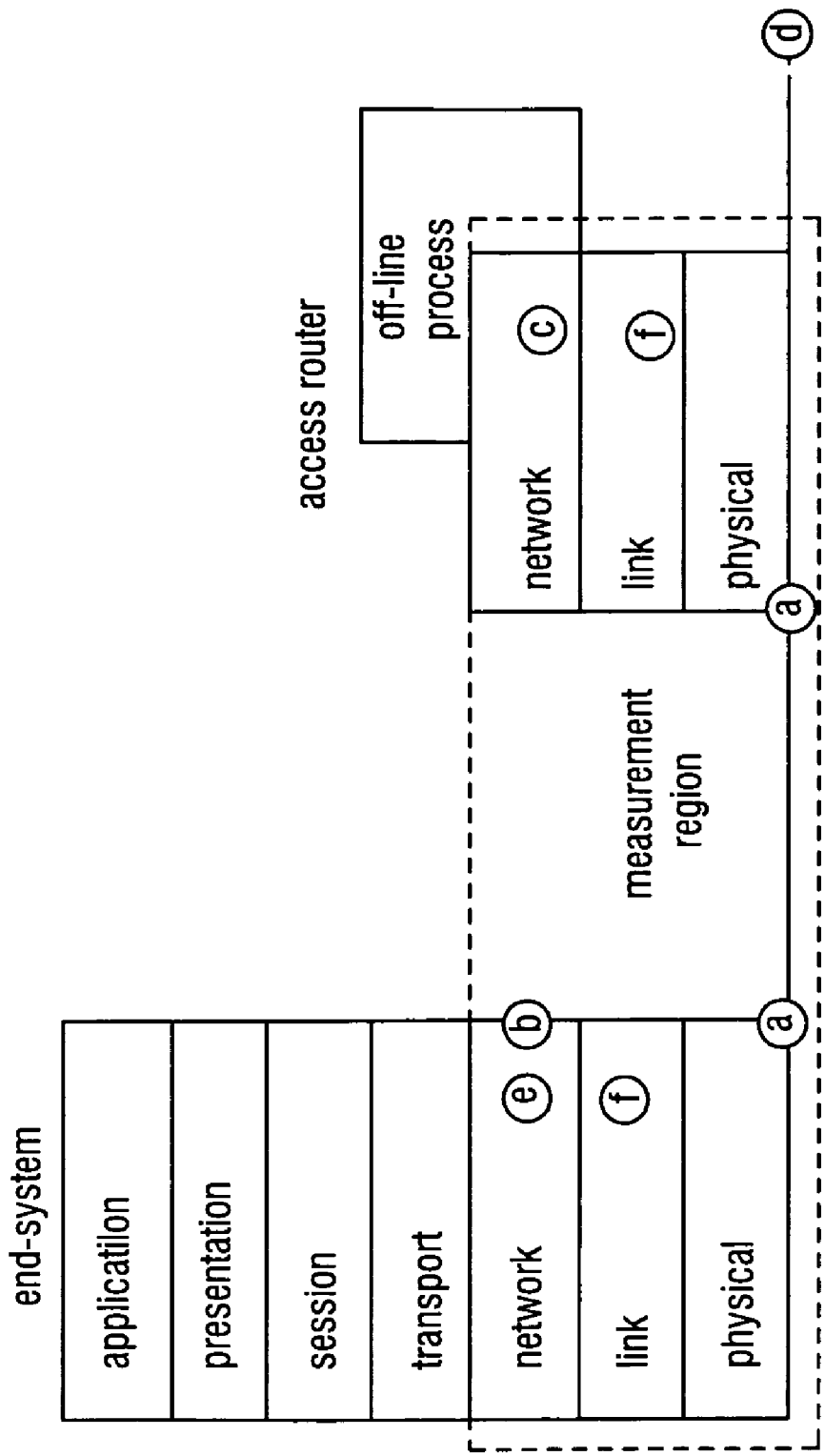
FIG. 4 is a schematic showing protocol stacks on a customer terminal and in the network domain.
Figure 5A:
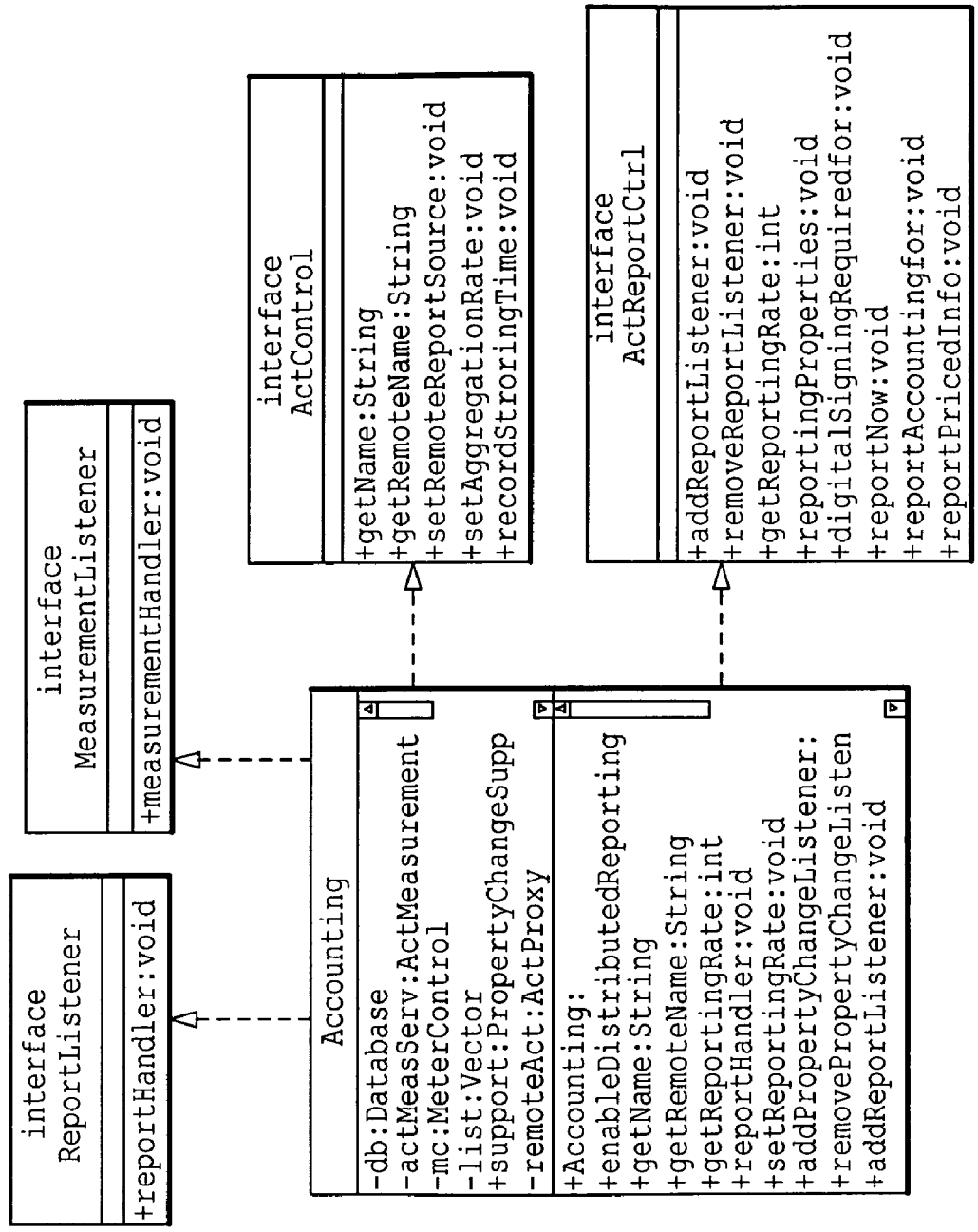
FIGS. 5a to 5e are class diagrams for software implementing accounting and measurement objects.
Figure 5B:
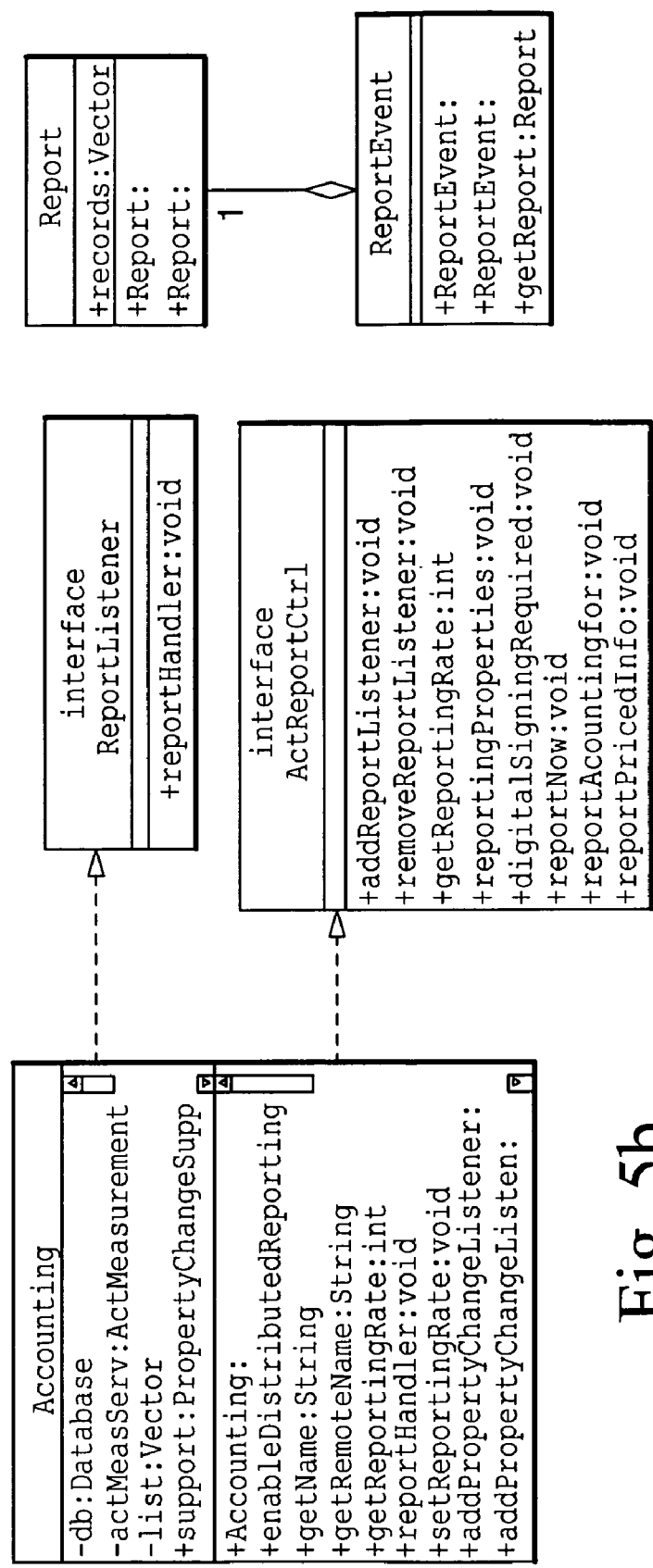
Figure 5C:
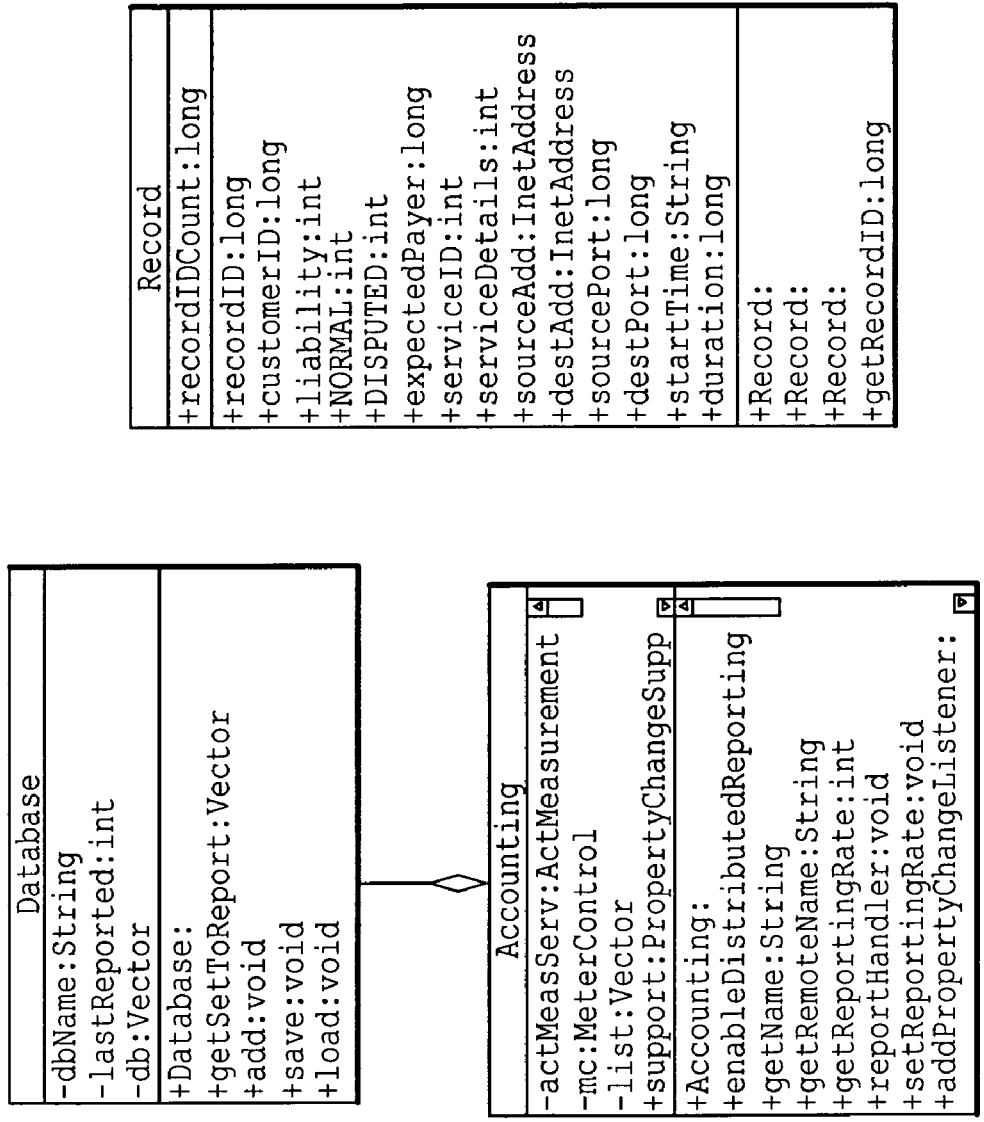
Figure 5D:
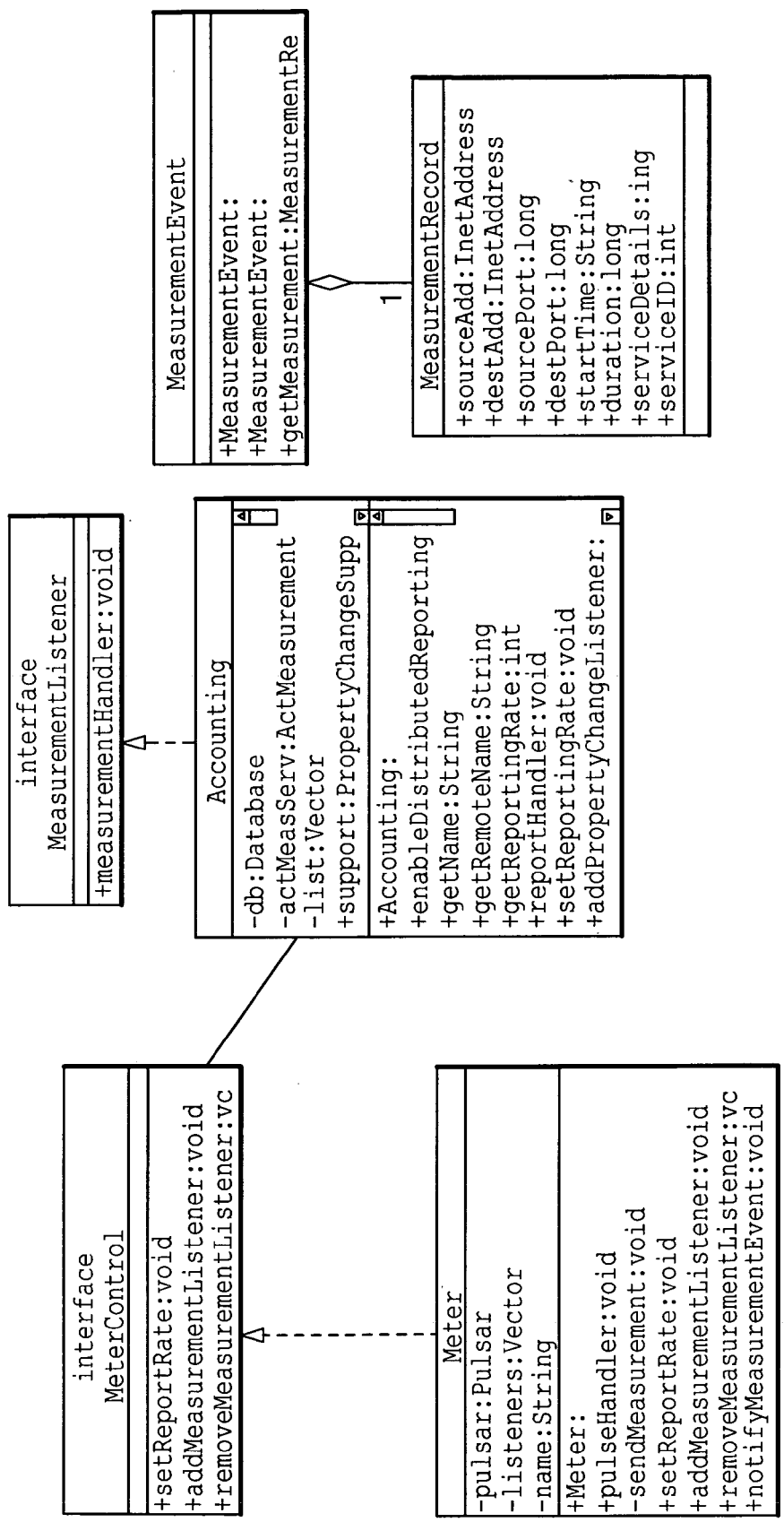
Figure 5E:
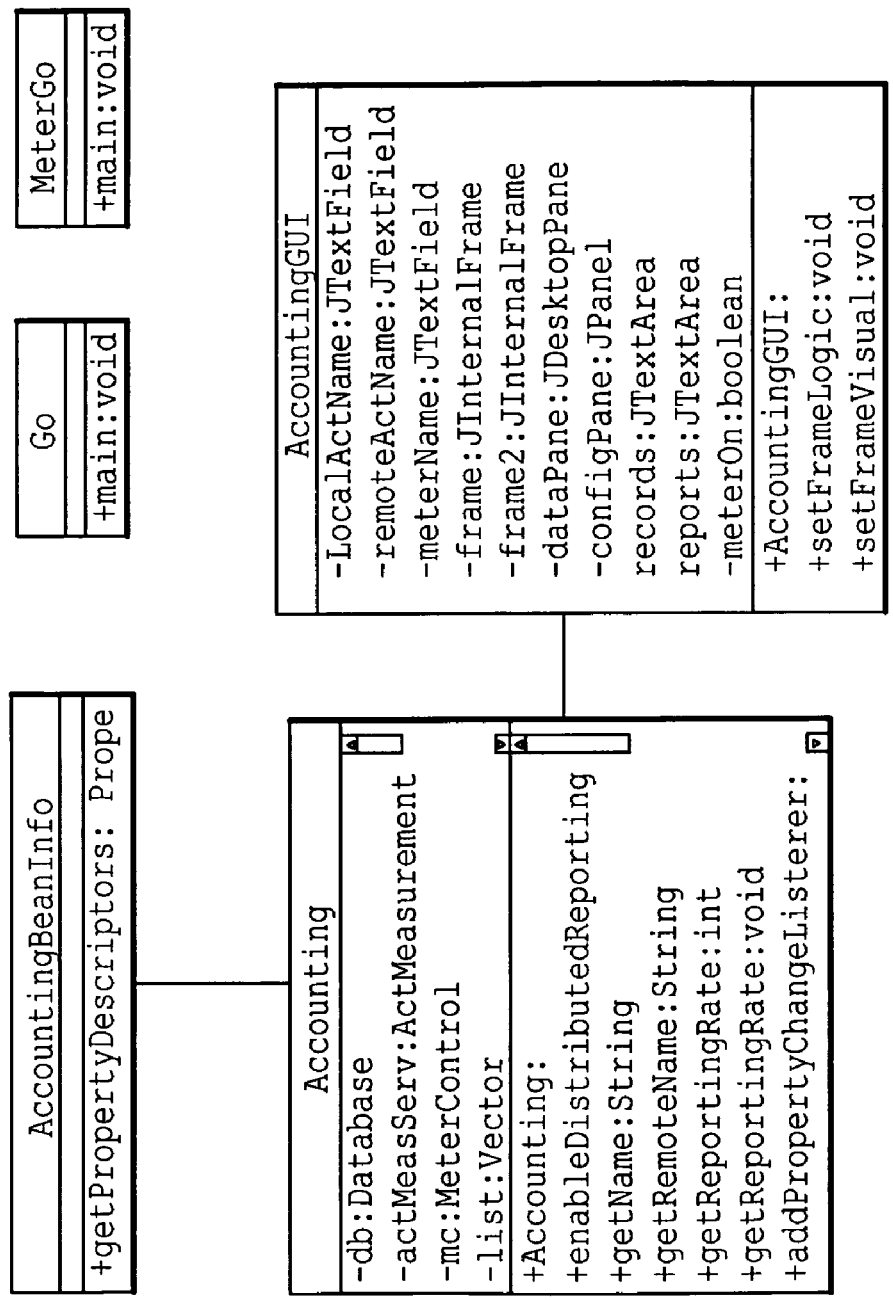

FIG. 4 shows the measurement region within protocol stacks on the customer terminal and in the retail network domain. Ideally there would be two measurement points within this region, one trusted by the customer and one trusted by the network, for example at the two points referenced (a) in the Figure. For ease of implementation, a single measurement point (b) trusted by both parties may be used. This might be implemented, for example within a secure module such as a cryptographic card on the client terminal. As an alternative, measurements may be made at different points with some possibility of discrepancies between measurements. On the network the practical measurement point is at the first access device(s) that, for each customer, inspects network layer headers (c) (IP in this case). ISPs should not measure any deeper into their network (d) because their access network and systems will introduce delays and losses.

For an individual customer (e.g. on dial-up access), a practical point at which to measure would also be alongside the network layer but in their end-system's stack (e).

Ideally these measurement points would be lower in each stack to be closer to the interface between the two parties and less likely to be affected by contention in the stack. However, measuring at the link layer (f-f) would be inappropriate because only some chargeable parameters set at the network layer will ever be reflected in link layer frames; network level multicast, end-end latency requirements etc. may never be visible at the link layer. Also, link layer headers would need to be ignored when measuring packet sizes for bandwidth calculations to avoid apparent discrepancies where different link technologies are chained together.

In the reception direction (up the stack) this choice of measurement points implies that the lower layers must be dimensioned (buffer sizes, interrupt and thread scheduling priorities) to cope with the most stringent QoS requirements of higher layers. As frames are taken off the physical media, the machine must be able to pass data up the stack without any chance that usage-charged data gets discarded (e.g. due to buffer overflow caused by interrupt contention) before it gets to the network layer. It is at the network layer where the ISP's service is to be measured and where it is most convenient for QoS requirements to control correct differential treatment of the various flows as they are passed further up the stack (on end-systems) or forwarded (on routers).

The measurement objects described above may be implemented using, with appropriate modifications, publicly available network metering software such as Nevil Brownlee's NeTraMet system. This is a software meter which conforms to the IETF internet accounting architecture described in RFC 2063 and RFC 2064. The meter builds up, using "packet sniffing", packet and byte counts for traffic flows, which are defined by their end-point addresses. Although generally, Addresses can be ethernet addresses, protocol addresses (IP, DECnet, EtherTalk, IPX or CLNS) or 'transport' addresses (IP port numbers, etc), or any combination of these, in the present implementation IP addresses only are used. The traffic flows to be observed are specified by a set of rules, which are downloaded to NeTraMet by a 'manager' program. Traffic flow data is collected via SNMP (Simple Network Management Protocol) from a 'collector' program FIGS. 5a to 5e are class diagrams illustrating an implementation of the measurement and accounting objects described above. The class diagrams are shown as a series of views.

The control view (5a) groups the classes related to control over the accounting class, including reporting control, metering-related control and general control functions. This view also relates to event dissemination. Control over the Accounting class is separated according to the type of control. This is why four interfaces are available. Two of those interfaces provide direct control over the behavior of the Accounting object and the two others are related to a Java event model used to communicate both reporting information and measurement information. The ActControl interface provides control over the accounting class that relates to the accounting behavior in general. It provides both methods to set a behavior or properties and methods to find out about the current behavior of the accounting object. For example, this interface is used to set the name of the accounting object or to query the Act object to find out a name previously given to the Act object. The ActReport interface provides control over issues related to account reporting. Control calls are directly related to the reporting behavior of the accounting object. For example, a method named addReportListener( ) is used to register interest in reporting information. Once the registration is effective, subsequent calls to other control methods define behavior such as the reporting frequency, request for immediate reporting, reporting security properties etc. The two other listener interfaces (Report & Measurement) that the Accounting class implements are used to indicate that accounting objects are interested in accounting reports and measurements.

The accounting report view (FIG. 5b) regroups the class related to the reporting behavior and reporting process in the accounting objects. The accounting objects listens to accounting reports and generates such events as well. Accounting objects generate accounting reports and distribute them (using the traditional Java event model) to objects that have registered their interest in such events. In the present implementation flexinet (A CORBA like distributed programming infrastructure) is used to support communication between objects so that the reports may be from objects that are remote from the accounting object. The Accounting class implements the ReportListener interface so that it can receive those accounting reports as well. The accounting report events are of a ReportEvent class. An event in this class is a traditional Java event which includes a Report object. The main attribute in the Report class is records. Records is a simple vector of accounting records. These records are described in the AccountingStoreView. The ActReportCtrl interface defines the control calls related to the accounting reporting process of an accounting object. Calls are available for an object to register interest in accounting reports, de-register interest and to control the reporting process.

The accounting store view (FIG. 5c) regroups the class related to the persistent storage of accounting information. An accounting object has a Database of accounting Records. The Record type holds accounting information which is not priced. Priced information is the subject of a different class. The Database class is a simple Vector of Record objects and it can be serialized to a file on a external storage medium. The database is also responsible for returning accounting records that have to be reported.

The accounting meter view (FIG. 5d) regroups the class related to metering aspect of the accounting class. This relates both to the reception of the measurement information in the accounting objects and also to the control of the Meter as well as the definition of a simple Meter class. The Meter class uses a "Pulsar" object that generates pulses events as required. The frequency of pulses is set by the Meter object. On reception of pulses the Meter generates objects of type MeasurementEvent. Objects implementing the MeasurementListener interface and that have registered their interest in measurement results will then receive those events via a measurementHandler method. As previously noted, the Meter object and one or more of the objects receiving measurement events may be remote from each other. A measurement event is a conventional Java event and includes a measurement record of type MeasurementRecord. An accounting object gets measurement information from a Meter over which it has got control via the MeterControl interface. A typical example of control is the measurement reporting frequency, that is, an accounting object may control the frequency with which a meter object sends reports to it. This control interface is also the one to use to register interest in measurement results.

The accounting miscellaneous view (FIG. 5e) regroups all the other classes that do not fit in the previously described views. This includes, JavaBean-related classes, classes to run the code and graphical user interfaces (GUI). The AccountingBeanInfo class is a JavaBean related class which modifies the description of some attributes on the Accounting class when those properties have to be graphically displayed in the BeanBox or in any other component builder tool. The Go and MeterGo classes only implement a main method. Go is used to launch an accounting object and MeterGo a Meter object. The AccountingGUI class is responsible for the GUI related to the accounting objects. The Meter object has no GUI associated with it. The Accounting GUI is shown in FIG. 6. The top part of the GUI includes data from the Accounting object and the bottom part relates to the control available over the accounting object. The control part is directly related to the control interfaces available for the Accounting objects. The accounting class is not aware of the GUI as the reference is from the GUI to the accounting class.

The accounting mechanisms described above can be used in combination with contracts between customers and retail and wholesale networks to establish liability to pay and who is expected to pay. The following section describes different clearing models for the making of payments. The systems described in this section may be used in conjunction with, or independently of the specific accounting mechanisms described above.

Payment Clearing

Figure 9:
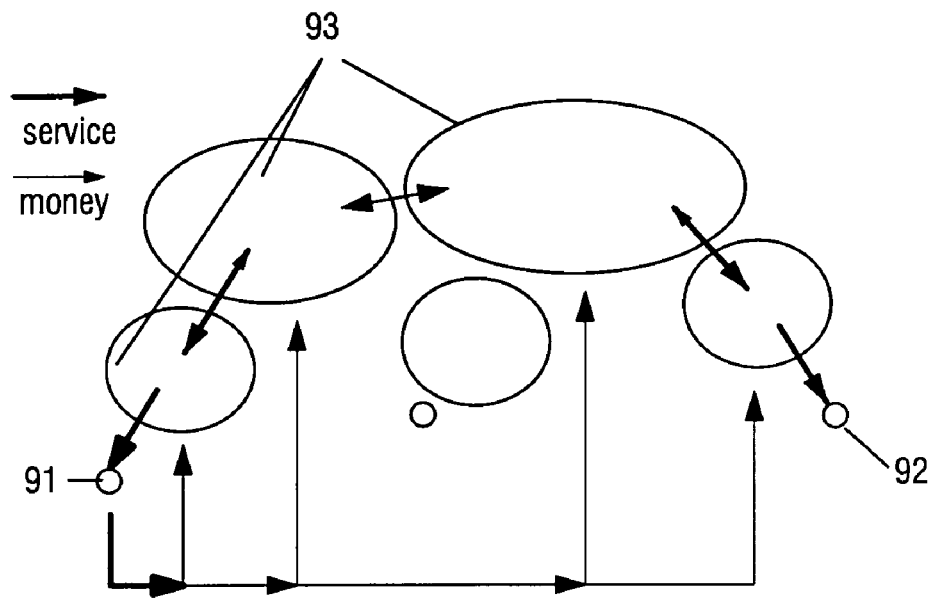
FIG. 9 is a diagram showing a network using service provider clearing.

As well as "liability to pay" and "who is expected to pay" there is also the question of who should be paid. Each edge ISP may be paid on a "half-circuit" basis for both their sent and received service. However other business models may be supported. In a business model where ISPs do not expect payment for all sent and received traffic to be made to all edge providers, instead a customer might pay their own provider on behalf of both (all) ends as in telephony. A further accounting field would appear to be necessary—a "payee" field. For instance, this alternative business model might be that the decision as to which end(s) payment from edge customers entered the system was made on a per flow basis by customers. We shall call this model the "provider clearing" model for reasons that will become clear as we go. This is shown in FIG. 9. Here, end customers 91,92 communicate via a number of intermediate networks 93. The financial flows between providers in this model depend on at which ends payment is entering the system on a per flow (or per packet) basis. For some flows, there may even be proportional sharing of costs between the ends. Therefore, for business model flexibility, rather than stating simply "local" or "remote" end, the "payee" field could be a "payee percentage" field instead—the percentage of the total cost to be paid by the customer at the end being accounted for. So usually it would be 100% or 0% in the typical cases of "paid completely to local provider" or "completely to remote". The balance would be the remote end's payment. Note, though, that the perceived purpose of this model is the transaction efficiency when the local payee gets 100%. However, there are certain disadvantages for the "provider clearing" model:

As already pointed out, the "payee percentage" field would have to drive inter-provider accounting, otherwise the revenue of an edge ISP and its upstream providers would depend on a factor completely outside their control—to which end its, customers chose to make payment. The "payee percentage" field would therefore have to be trusted by upstream providers. To help prevent the field being tampered with, it would need to be signed by the remote ISP. How signed fields are aggregated without losing the signature integrity. The aggregation might have to be done by software signed by a third party trusted by all the parties involved (TTP) and then the record re-signed by the TTP. However the aggregation software would also have to run on a host trusted by the TTP. Further, using this model would mean that all edge ISPs would have to be able to identify any remote ISP from the remote address, something not possible with hierarchical routing. Nonetheless, we have already stated that the payment interface of the remote ISP can be passed in a higher level protocol between end stations. It would be only slightly more complex for them to include this in the accounting record. However, the ISP would still have to make appropriate checks that this was a valid ISP and that it matched the remote address. Once it has the address this becomes trivial, but more inefficient and tends to negate the advantage of the local ISP doing the clearing via its upstream provider. Still further complication might be introduced for some future applications if the share of payment between the parties wasn't fixed but depended on characteristics of the flow or other parameters only understood at a higher level—higher than the provider would normally be interested in. This is also a problem for the "expected payer" field, but in that case the field is informational only, unlike the "payee percentage" field in the "provider clearing" model.

The payment should ideally be split taking into account the current prices of all the edge providers who will eventually be paid. The only alternative (used in the international accounting rate system (IARS) for telephony) is for ISPs to agree compromise prices between themselves that average out price inconsistencies.

Because of the much longer provider chains typically found on the Internet, potentially unacceptable delays will be introduced before the revenue arrives in the correct place. Any delay in clearing hugely increases the cost of the payment system, as extra trust mechanisms have to be invoked while the payment remains unconfirmed. These trust mechanisms have to be applied to the edge customers, not just the providers, therefore hugely increasing the total cost of the system.

Figure 10:
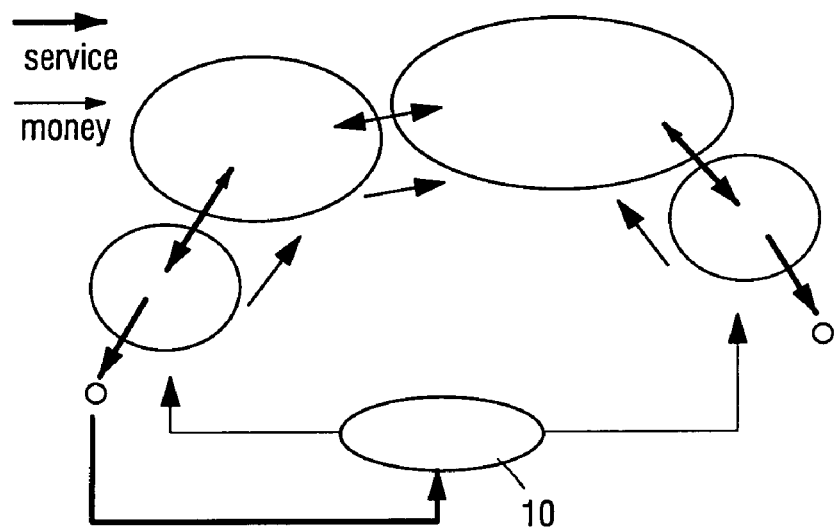
FIG. 10 is a diagram showing a network using third party clearing.

Despite this limitations, such a model appears to reduce the number of payment transactions. For example, if the parties in an Internet 'phone conversation are both (all) being paid for by the caller, it appears less complex for the caller to pay everyone's payments to her own ISP, then let the ISP transfer the correct amount to its upstream provider as part of a bulk transaction. On the other hand, in a "third party clearing" model (shown in FIG. 10), the caller has to split up the payment between both (all) ISPs of both (all) parties involved.

This is why the distinction between the names of the two models is in the clearing, not who is paid. Both models end up with edge ISPs paid on a half-circuit basis. The difference is merely in the route the payment takes from payer to payee. With provider clearing the payment follows the data path. Along the way, providers take their cut with two types of money sharing being mixed together: wholesale cut half-circuit sharing In a "third party clearing" system (also termed end-to-end clearing), the clearing house role deals with the half-circuit sharing (including the straightforward price differences between the two ends) leaving inter-provider accounting to be purely about wholesaling. The third part clearer may be implemented on one of the management platforms 10 or on an additional platform connected to one of the network domains. Providers or customers may assume the clearing house role, but the accounting information model is based on a third party clearing system to allow for the most general case. To clarify, whether the paying customer makes payment to a dedicated clearing house, direct to the ISP at the remote end or even direct to the remote customer so that they can pay their own ISP, in all cases, the role of clearing is separate even if there is no separate enterprise to achieve the function. The last case is special—the clearing role is null, but it still appears in the information model. The charges for all ends are not lumped together while accounting. If the half-circuit sharing is achieved through the provider chain, this must be kept separate from the accounting for wholesale. If it is not, the types of model that can be built on the infrastructure are restricted.

Having separated out the role of clearing, this now shows explicitly that a telephone company also bundled another role in its business—that of "session retailer". That is, the edge telco is offering telephony sessions at fixed prices, but the range of prices is less than the number of possible ways the price could vary if it were simply composed of all the end to end prices charged by providers necessary to assemble each session. Again, this role may be assumed by the edge customer in the Internet world, but it is possible for other parties to offer prices for transmissions by selling on IP service while absorbing variations across providers in the prices they are charged wholesale. This role may also continue to be taken by telcos and ISPs too.

It is redundant to state in accounting messages which end will actually be paid. Who should eventually receive the payment is implicit because the rule is now that accounts for other providers shouldn't be lumped with accounts for the local provider. The corollary is that any accounting implicitly relates to payments that will eventually be made to the local provider. Saying who will be paid is redundant during accounting. It is only relevant at the time of payment. Then it is essential to say who the payment is eventually intended for if it is given to a clearing organization.

Figure 11:
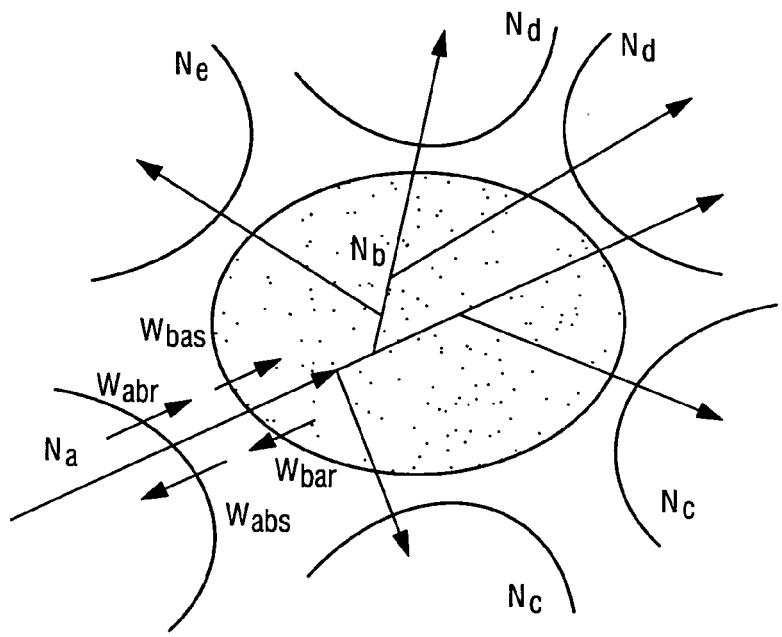
FIG. 11 illustrates split edge pricing.

FIG. 11 shows the use of edge pricing in the network figure. A packet is shown being multicast from $N_a$ into $N_b$ and onward into the other networks $N_c$, $N_d$ and $N_e$. Because multicast is a general case of unicast this allows us to model both topologies. We will also be able to treat the topology as aggregation$^{(i)}$ by reversing the direction of transmission. The term packet is used, but the arrows could represent flows of similar class packets for a certain time. The packet or flow being modeled could be data or signaling. It is not necessary to model multi-source multicast separately because packets from different sources always remain separate. FIG. 11 highlights the pricing between networks $N_a$ and $N_b$, $W_{bas}$ and $W_{bar}$ denote the per direction weightings applied to the charge which $N_a$ applies to $N_b$ for sending data to $N_b$ and for receiving data from $N_b$ respectively, while $W_{abr}$ and $W_{abs}$ denote per direction weightings applied to the charge which $N_b$ applies to $N_a$ for receiving data from $N_a$ and sending data to $N_b$ respectively. Each weighted price is for transmission between the edge in question and the remote edge of the internet, not just the remote edge of that provider. There are four price weightings like this at every inter-network interface, but the weights would take different values unless the neighbors are of the same status. Thus the payment for traffic in any one direction across each interface depends on the difference between the two weighted prices offerent by the networks either side. In other words, no assumptions are made about who is provider and who is customer; this purely depends on the sign of the difference between the charges at any one time. Clearly, edge customers ($N_c$, say) have no provider status in the networking market. So, for all j, $W_{jcr}$=0. We can then analyze scenarios like 'only senders pay' or 'only receivers pay' by setting all receiving weights to zero or all sending weights to zero. For instance, stability of a policy can be determined by assessing whether one network would gain from a maverick policy 'Only senders pay' or 'only receivers pay' tends to encourage migration of customers who are primarily receivers and those who are primarily senders to different providers. This situation is tenable because the provider with all the non-paying customers gets all its revenue from its interconnect business. Either scenario remains stable, because if one network goes maverick (e.g. only charges receivers when everyone else is only charging senders), both predominant senders and receivers have a choice of cheaper provider. Therefore the income to the whole system reduces ensuring the maverick provider would go bust first—sufficient disincentive to be maverick! However, both these policies clearly make network utilization inefficient and both are unstable where multicast (and consequently aggregation) are concerned.

In contrast, 'senders and receivers pay' is stable in both unicast and multicast cases. It also doesn't lead to inefficient network utilization unlike the above cases. It is also possible to cater for different balances of predominant senders and receiver by weighting the sending price differently to the receiving price. For instance if there are a few big predominant senders but many small predominant receiver, the economy of scale in managing a large customer can be reflected in a lower sender weighting. Similarly, the inefficiencies of multicasts to small receiver communities compared to multiple unicasts can be discouraged by slightly weighting multicast sender pricing.

Figure 13:
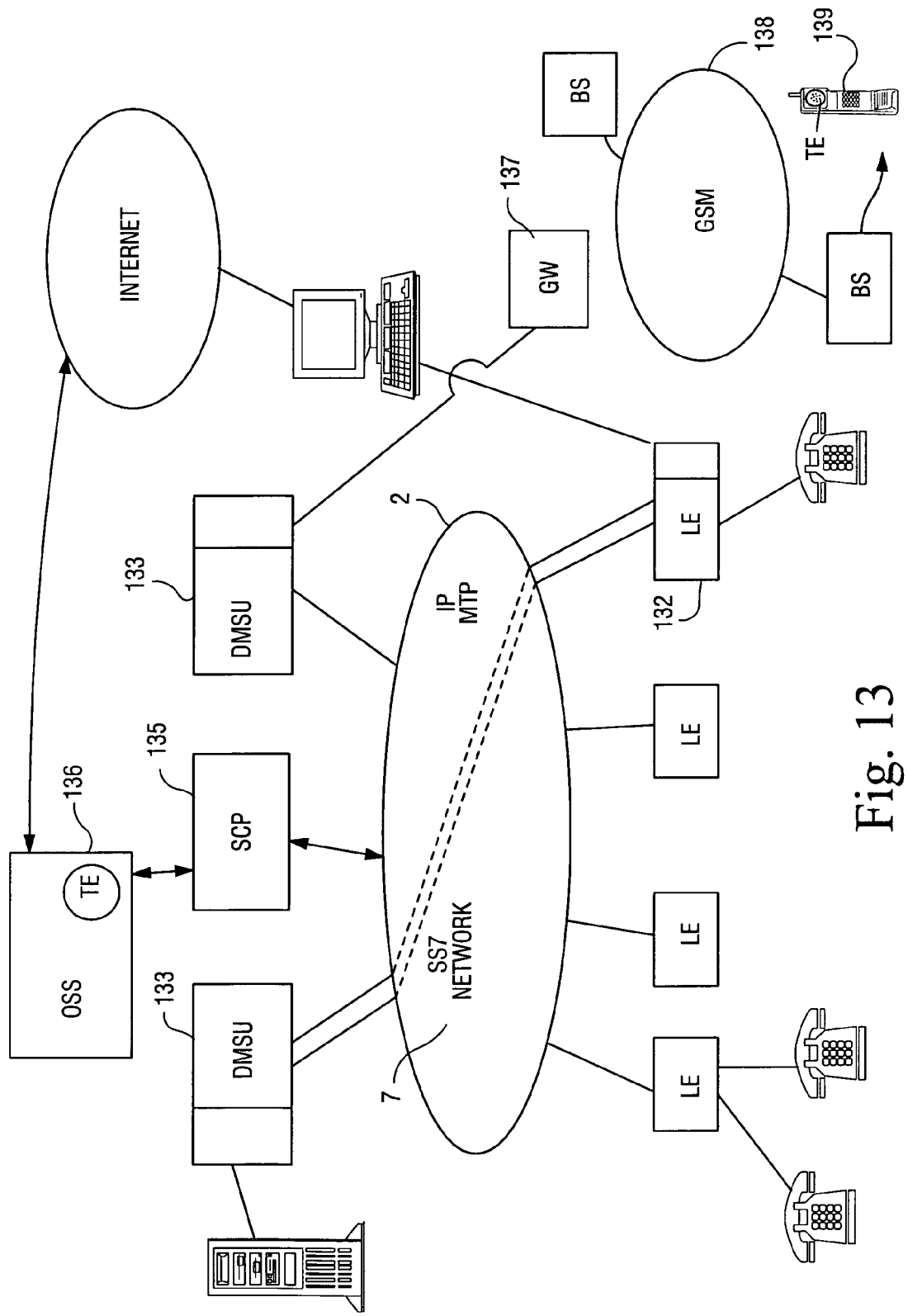
FIG. 13 shows an alternative embodiment.

Although the examples so far described have been in the context of federated packet data networks, such as the Internet, many aspects of the invention can also be used with advantage in other types of network, such as in a circuit-switched PSTN (public switched telephony network). FIG. 13 shows an example of the invention applied in this context. In this network, customer terminals 131, which are in this example so-called intelligent phones, that is telephones incorporating a microprocessor and a data interface, are connected via local exchanges 132 and trunk exchanges 133 to the telephony networks 2. The trunk exchanges 133 are connected via a common channel SS7 (signaling system number 7) signaling network to a service control point 135 that is responsible for the execution of advanced call control functions. The service control point 135 is also connected to an operational support server 136 that is responsible for billing operations, and that, in this example, controls the setting of tariffs for the network. The OSS server and customer terminals include tariff entities (TE). The fixed PSTN network is also interconnected via a gateway 137 to a cellular GSM network 138. Base Stations BS in the cellular network communicate signals to intelligent mobile phones 139. In operation, network tariffs are distributed to customer terminals via the PSTN network and via the GSM network. Conveniently, the tariff may again take the form of Java functions which are executed on processors in the customer terminals. The Java functions may be streamed as Internet packets. In one implementation, these Internet packets may be distributed via the PSTN networks and GSM networks themselves. For example, the packets may be encapsulated and transported to the trunk exchanges using the MTP (message transport part) transport layer and may be communicated onwards to the customer terminals using out-of-band signaling. Alternatively, a separate data connection may be established between the OSS server and the customer terminals via the public internet. As in the examples above, the network operator monitors the loading of resources within the network and may transmit signals to the tariff entities in the customer terminals to change the tariff to reflect the scarceness or otherwise of relevant resources. Customer terminals may themselves monitor network loading and automatically generate variations in the tariffs. Usage of network resources may be measured locally by the customer terminals instead of conventional billing carried out within the network. The network operator may police the measurement of usage data by carrying out sampling, as described previously.

What is claimed is:

1. A method of operating a communications network comprising:
   a) measuring at each of a plurality of customer terminals usage by the respective customer terminal of network resources;
   b) calculating a network usage charge from measurement data generated by said measuring at each of the plurality of customer terminals usage by the respective customer terminal of network resources in step (a); and
   c) sampling usage of the network resources by at least one of the customer terminals by performing:
      (i) measuring a portion of the usage of the network resources by the at least one of the customer terminals; and
      (ii) comparing data corresponding to the measurement of the network resources in step (c)(i), with respect to the sampled usage, with data corresponding to one or both of the usage of network resources measured by the at least one customer terminal in step (a) and the network usage charge calculated in step (b).

2. A method according to claim 1, further comprising a step of aggregating measurement data produced by a series of measurements at a respective customer terminal.

3. A method according to claim 1, further comprising storing the measurement data.

4. A method according to claim 3, including storing with the measurement data identifying a tariff applicable to the said measurement data.

5. A method according to claim 1 including communicating data generated by step (a) to a network accounting object controlled by a network operator.

6. A method according to claim 5, including communicating to the network accounting object a usage charge calculated from the measurement data.

7. A method according to claim 5, wherein sampling the usage in step (c) is performed by a network operator and sampling the usage in step (c) comprises sampling only part of the traffic communicated between a customer terminal and the network, comparing data corresponding to the sampled network usage with data communicated from the customer terminal to the network accounting object, and detecting any discrepancy.

8. A method according to claim 7 including penalizing a customer when a discrepancy is detected.

9. A method according to claim 1, including communicating measurement data to a system remote from the customer terminal.

10. A method according to claim 1 in which a network accounting object is configurable to receive data from a measurement object controlled by a network operator or from a customer terminal.

11. A method according to claim 10, in which a customer accounting object associated with the customer terminal is configurable to direct data to the network accounting object.

12. A method according to claim 10, including switching the network accounting object from a first configuration in which data is received from the said measurement object and another configuration in which data is received from the customer terminal in response to a control signal received at the network accounting object.

13. A method according to claim 1 further comprising communicating a tariff to each of the customer terminals, and calculating at each of the terminals from the tariff and from accounting data the network usage charge.

14. A method according to claim 1 in which the communications network is a federated data network comprising a plurality of network domains.

15. A method according to claim 14 including
   communicating traffic between a customer terminal and a first network domain connected to the customer terminal;
   further communicating the said traffic between the first network domain and a second network domain connected to the first network domain;
   communicating network usage data from the customer terminal to a first network accounting object in the first domain; and
   communicating accounting data between the first network accounting object and a second network accounting object in the second domain.

16. A method according to claim 15, including determining from a current routing table in the first network domain the identity of a second domain, wherein the second domain is communicating data with the customer terminal via the first network domain, and communicating network usage data for the customer terminal to the second domain identified by the current routing table.

17. A method according to claim 1 in which the step of measuring includes counting the quantity of data communicated in packets transmitted between the customer terminal and the communications network.

18. A method according to claim 17, including measuring packets received by the customer terminal and packets sent by the customer terminal.

19. A method according to claim 17, wherein the packets are data packets.

20. A method according to claim 17, wherein the packets are IP packets.

21. A method according to claim 17, wherein the packets are message packets.

22. A method according to claim 1, in which a payment for network usage is made to a third-party clearer.

23. A method according to claim 1, including automatically varying a tariff for network usage in dependence on loading of the network, and calculating a charge for network usage by applying the tariff to the measurement data.

24. A method according to claim 1, including transmitting packets on the network with a plurality of different classes of service.

25. A method according to claim 24, including passing the said packets through a packet router, and in the packet router determining the classes of service applicable to the packets, and scheduling packets differently depending on the respective class of service.

26. A method according to claim 25, in which a step of policing the classification of packets to determine the eligibility of a packet for a respective class of service is carried out at a location remote from the router.

27. A method according to claim 26, in which the step of policing is carried out at a customer terminal.

28. A method according to claim 27, in which the policing by the customer is randomly audited concurrently with, or subsequently to, the respective data flow.

29. A method according to claim 24, wherein the packets are data packets.

30. A method according to claim 24, wherein the packets are IP packets.

31. A method according to claim 24, wherein the packets are message packets.

32. A communications network arranged to operate by a method according to claim 1.

33. A customer terminal arranged to operate by a method according to claim 1.

34. A method of operating a communications network having network resources and including a plurality of customer terminals operable to use the network resources, the method comprising:
   a) each terminal measuring the amount of network resources which said each terminal uses; b) calculating a charge with respect to each terminal for said each terminal's use of the network resources as determined by the respective terminal measuring the amount of network resources which said each terminal uses in step (a); and
   c) performing a sampling step to check the validity of the measurement of the amount of network resources performed by each terminal, wherein at some part of the network other than at the respective terminal, only a part of the total use of network resources made by the respective terminal is measured and compared with data corresponding to either the measurements of the amount of network resources taken by the respective terminal in step (a) or the charge calculated in step (b).

35. A method of operating a communications network comprising:
   measuring usage of network resources at each of a plurality of customer terminals;
   sampling usage of the network resources by a customer terminal by measuring a portion of the usage of network resources by that customer terminal;
   comparing data corresponding to the measured portion of the usage of network resources with data corresponding to the usage of network resources measured at the customer terminal or data corresponding to a usage charge calculated from the usage of network resources measured at the customer terminal;
   wherein said sampling includes monitoring, by the network, a sample of actual network usage as a policing measure and checking that the sampled usage corresponds to the usage and/or cost reported by the corresponding customer terminal;
   wherein said monitoring, by the network, does not include continuous monitoring of all of the usage by the corresponding customer terminal but does include intermittent sampling of the usage by the corresponding customer terminal, thereby checking the accuracy of the usage and/or cost reported by the corresponding customer terminal and reducing a burden on the network.

* * * * *